Dec. 4, 1956 A. S. HOWELL 2,773,223

HIGH IMPEDANCE TELEPHONE SUBSTATION RINGER

Filed May 16, 1955 3 Sheets-Sheet 1

INVENTOR.
ARTHUR S. HOWELL
BY T. L. Bowes
ATTORNEY

Dec. 4, 1956 A. S. HOWELL 2,773,223

HIGH IMPEDANCE TELEPHONE SUBSTATION RINGER

Filed May 16, 1955 3 Sheets-Sheet 2

INVENTOR.
ARTHUR S. HOWELL
BY T. L. Bowes
ATTORNEY

INVENTOR.
ARTHUR S. HOWELL
BY T. L. Bowes
ATTORNEY

United States Patent Office 2,773,223

Patented Dec. 4, 1956

2,773,223

HIGH IMPEDANCE TELEPHONE SUBSTATION RINGER

Arthur S. Howell, Rochester, N. Y., assignor, by mesne assignments, to General Dynamics Corporation, a corporation of Delaware Application May 16, 1955, Serial No. 508,575

17 Claims. (Cl. 317—171)

Figure 2:
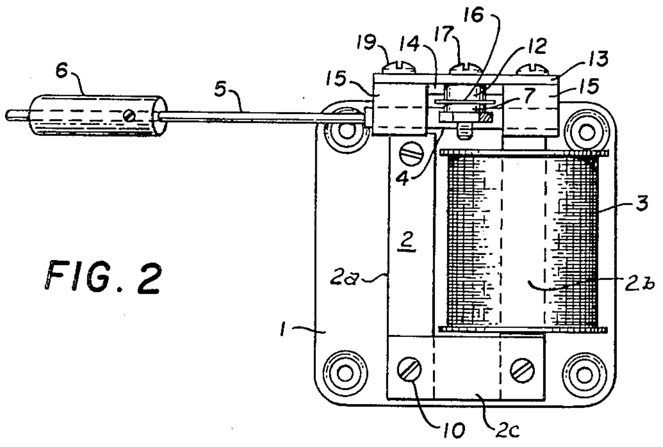

This invention relates to electromagnetic signal apparatus and more particularly to telephone ringers. This is a continuation in part of my copending application Serial No. 256,578, filed November 15, 1951, and assigned to the same assignee as the present application.

Telephone apparatus commonly located at telephone subscribers' stations generally includes telephone ringers to apprise the called subscriber that another substation, operator, or the like, is calling his station. Such ringers conventionally comprise an electromagnetically controlled vibratable clapper rod which supports a clapper between two spaced-apart gongs in such a manner that as the rod and clapper are vibrated by magnetic means, the clapper alternately strikes the gongs in order to produce a ringing signal.

It is an object of my invention to provide a new and improved telephone ringer.

It is another object of my invention to provide a new and improved ringer assembly for vibrating clapper rods of telephone ringers of the above-described type.

It is a further object of my invention to provide a ringer assembly having high impedance both at ringing and also at voice frequencies.

Still another object of my invention is to provide a new and improved telephone ringer having an improved arrangement of parts resulting in a simple and reliable construction of improved efficiency, simplicity of production and assembly, and increased dependability.

In previous substation ringers used in the telephone art, the longitudinal axis of the moving armature was disposed substantially at right angles to the axis of parallel but not coaxial cores. In such an arrangement, the disposition of the flux carrying parts is such that the permanent magnet flux encounters a high reluctance path in passing into the armature. That is, the flux from the permanent magnet enters (or leaves) the aramture through a high reluctance air leakage path that is effectively in series with the parallel reluctance of the operating air gaps between the core pole faces and the armature. The reluctance of this leakage path usually exceeds that offered to the flow of the steady polarized flux by the operating air gaps and hence exerts a controlling effect on the design of a suitable permanent magnet to produce the desired value of steady flux in the operating air gaps. This results in a greater volume of magnet material than would be required by the reluctance of the operating air gaps alone. Also, for a given magnetic material the higher reluctance of the magnetic circuit results in a longer magnet when the length and cross sectional area of the magnet are to be proportioned for optimum efficiency per unit volume of magnetic material. With the present trend toward the reduction of the physical size of substation components it is advantageous to reduce both magnet length and volume. A feature of my invention is the means employed to substantially reduce the reluctance of the air leakage path by which the steady flux is conducted into the armature and thereby to effect a substantial reduction in magnet length, magnet volume and magnet cost. These means include the use of a yoke of magnetic material, magnetically connected to the ringer base, and disposed to form one or more air gaps in parallel between the edges of the armature and the inner faces of the yoke.

In addition to the means described herein to obtain a low reluctance flux path into the armature, another feature of my invention is the use of a base of magnetic material to conduct the magnet flux from one pole of the magnet to the armature, or, with reference to the particular form of the design described, to conduct the magnet flux from one pole of the magnet to the magnetic yoke and thence to the armature.

Figure 1:
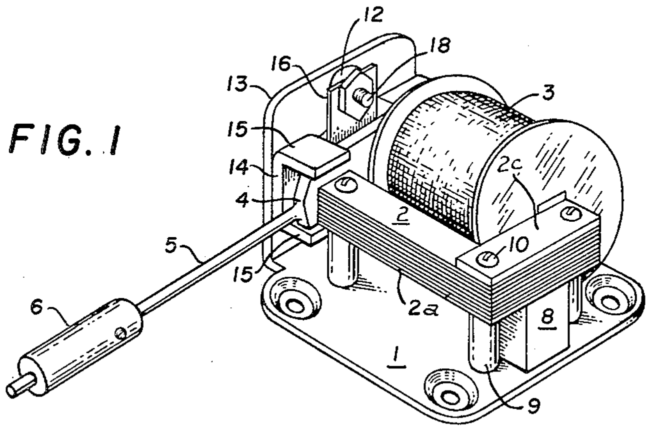
Figure 3:
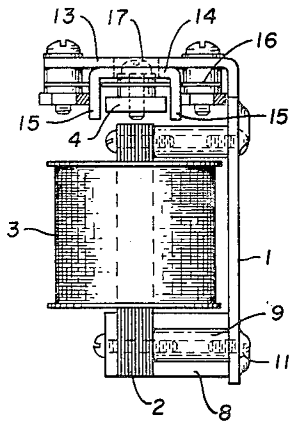
Figure 8:
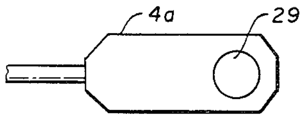
Figure 9:
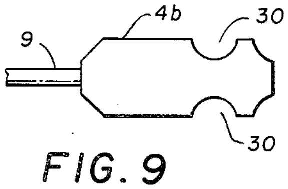
Figure 4:
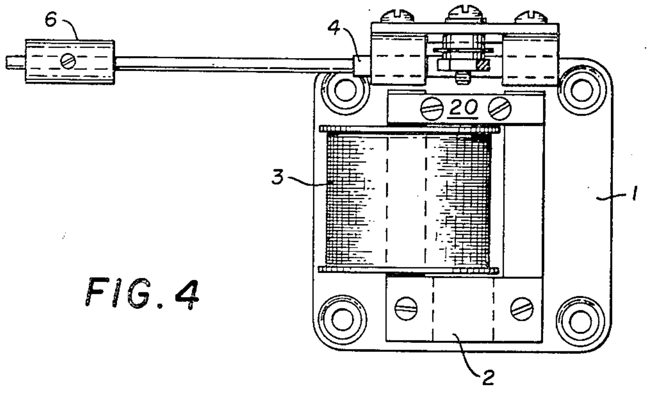
Figures 5, 6, 7:
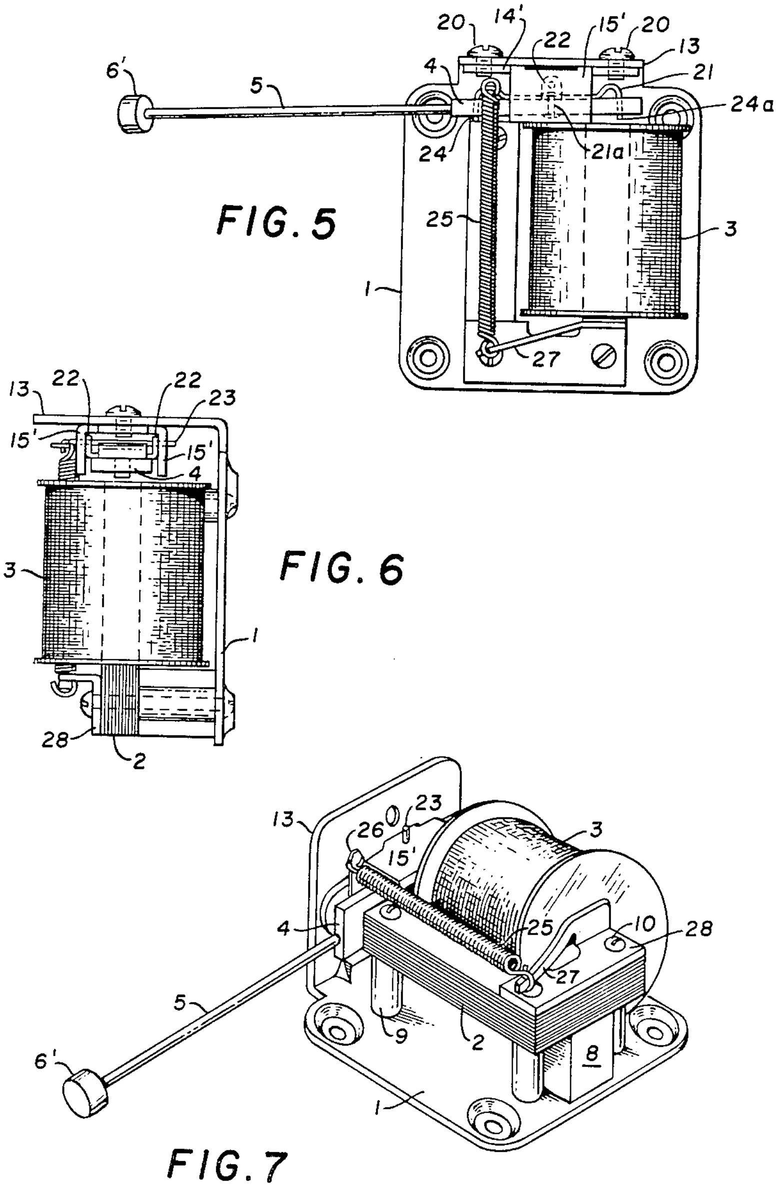

The features of my invention which I believe to be novel are set forth with particularity in the appended claims. My invention itself, both as to its organization and manner of operation, together with further objects and advantages thereof, may best be understood by reference to the following description taken in connection with the accompanying drawings, in which:

Fig. 1 is a perspective view of a telephone ringer assembly embodying the principles of my invention, Figs. 2 and 3 illustrate top and end views, respectively, of the telephone ringer shown in Fig. 1, Fig. 4 shows an alternative form of ringer assembly, Figs. 5 to 7, inclusive, illustrate still another embodiment of my invention, and Figs. 8 and 9 illustrate modified armature members useful in the assemblies of Figs. 1 to 7.

The ringer assembly shown in Figs. 1 and 2 of the drawing comprises a base 1 of suitable magnetic material upon which is mounted an electromagnetic component comprising a U-shaped laminated magnetic core 2 and a single ringing current coil 3 disposed about one leg of the U-shaped core. Core 2 may be formed from any suitable magnetic material of high permeability such as silicon steel, for example, and may comprise spaced legs or arms 2*a* and 2*b* and a closed end 2*c*. In the illustrated form of my invention, core 2 is shown mounted on base 1 by means of a plurality of non-magnetic standoffs or posts 9 and screws 10 and 11. The use of a laminated core of low core loss magnetic material reduces core losses and substantially aids in the maintenance of a high value of ringer inductance and impedance at voice frequencies. The placement of all of the coil turns on one leg of a U core structure in the presence of the presently described magnetic shunt including permanent magnet 8 and base 1 results in an inherent dissymmetry in the flux changes in the two core legs produced as a result of an alternating current flowing in the coil. The use of a U lamination form of core stack permits of a compact magnetic structure of low reluctance and improved coupling factor that tends to minimize the inherent flux dissymmetry from the employment of a single coil. It is possible, of course, to dispose half of the required coil turns on each of the core legs. However, the use of a single coil disposed on one core leg is less costly from a manufacturing standpoint.

Adjacent the ends of arms 2*a* and 2*b* of core 2 there is suitably mounted an armature 4 of magnetically conductive material which carries arm or rod 5 and weight 6 arranged to strike suitably disposed gongs (not shown). A permanent magnet 8 is mounted between base 1 and core 2. As is seen from the drawing, magnet 8 is preferably a bar type permanent magnet of any suitable composition having coincident polar and longitudinal axes and is disposed such that its ends are in fixed abutting relationship with the closed end of the U-shaped core and one portion of the L-shaped base 1, respectively. Thus, one pole of permanent magnet 8 is adjacent the core 2 and the other pole is adjacent the base 1. As shown in the drawings, the cross-sectional area of the magnet 8 is appreciably smaller than the surface area of the base 1.

Base 1 is provided with an angularly extending flange 13 which serves as a mount or support for the armature assembly. A laterally extending yoke 14 of magnetically conductive material is suitably secured to the inner surface of flange 13 as by means of screws 19. At each end of yoke 14 there is provided a pair of substantially parallel, spaced-apart pole forming portions or arms 15 extending towards the ends or arms of core 2 on either side thereof. Yoke 14 is so positioned that arms 15 are disposed to provide substantially equal air gaps between the ends thereof and the corresponding ends of core 2. With this arrangement, flange 13 serves not only as a mount for the armature assembly but also as a means for conducting the permanent magnet flux into the yoke 14.

Armature 4 is carried or connected intermediate the ends of a flat torsion spring or reed 16 as by means of a screw 17. The ends of spring or reed 16 are suitably secured to flange 13 as by means of screws 18. In order to insure the proper location of armature 4 and spring 16 with respect to the pole portions or arms 15 and the ends of core 2, the mounting means for each may include suitable spacers 7 and 12.

Armature 4 is elongated and is preferably substantially rectangular in shape and is mounted to extend between the two sets of arms 15 in edgewise relationship therewith, the edges of armature 4 thus cooperating with arms or portions 15 to establish a pair of air gaps in parallel at each end of yoke 14. With the foregoing arrangement of armature 4 with respect to the pole portions 15 and core ends 2 there are provided parallel direct current flux paths from one pole of the permanent magnet 8 through core 2, across the gap between the core 2 and armature 4, through armature 4, across the gaps between armature 4 and yoke flanges or portions 15 in parallel, yoke 14, and the two portions of base 1 to the other pole of the permanent magnet 8.

Telephone ringers of the harmonic ringing type must be adjusted to operate at one of a plurality of frequencies of ringing current. Both the mass of the clapper and the compliance of the reed 16 may be varied to respond to the particular frequency desired and to maintain a ratio of mass to compliance that is of the same order of magnitude throughout the frequency range. The compliance of the reed may be varied by changing the cross sectional area between supports. In order that an entire series of springs or reeds may be mounted in the same position on flange 13 of base 1, it is preferable to change only the thickness of the material. To minimize the number of stock thicknesses to cover the wide range of frequencies involved, it is possible to reduce the width of the sections in torsion and between supports by suitable cut outs and thus effect a reduction in reed stiffness.

Referring to Fig. 4 there is shown a modified form of the ringer shown in Figs. 1, 2, and 3. In the arrangement shown in Fig. 4 there is provided a magnetic shunt 20 extending between the ends of the U-shaped core 2 and which changes the alternating current flux in the system without substantially changing the direct current flux and thereby changes the inductance of the ringer.

Another form of my design, not shown, involves the substitution of a U-shaped magnetic structure comprising legs or cores of a cylindrical and solid section of magnetic material and magnetically connected at their extremities by a rectangular section bar of magnetic material to form the base of the U instead of the laminated core shown in the drawings. A bar magnet may be positioned with one pole face adjacent and in contact with the lower face of the core connecting bar and with the opposite pole face adjacent and in contact with the base. The armature suspension and yoke are identical with that shown for the U laminated structure. Hence, the general configuration of the U laminated structure is maintained. This structure is not as desirable as the laminated structure from the standpoint of maintaining high inductance at voice frequencies, as has been pointed out but one advantage of this solid core structure is the ease with which the pole face area can be independently varied with respect to the cross sectional area of the core, the desired change in area being accomplished either by necking down the core at the pole faces or by adding pole shoes of enlarged area as required.

It is possible to add pole shoes at the extremities of the open ends of the U laminated structure in order to yield increased pole face area. Such pole shoes may be of L shape and bolted to the laminated core legs at their extremities, for example.

In Figs. 5 to 7, inclusive, there is illustrated still another embodiment of my invention. The same magnetic core and polarizing assembly is employed as shown in Figs. 1 to 4, inclusive, but a modified armature assembly is provided. Comparable elements are identified by the same numerals used in describing the previous embodiments of my invention.

A yoke 14′ of magnetically conductive material is provided with a pair of parallel spaced-apart flanges 15′. Yoke 14′ may be suitably fastened to flange 13 of base 1 in any suitable manner, as by means of screws 20 engaging suitably tapped openings at either end of yoke 14′. Means is provided for mounting armature 4 in edgewise relationship between the flanges or arms 15′, the flanges 15′ providing pole portions for cooperation with the armature 4, there resulting a pair of air gaps between armature 14′ and flanges 15′. For this purpose there is provided a generally U-shaped member 21 of suitable non-magnetic material such as brass, for example, which may be secured in any suitable manner to armature 4, as by means of a rivet 21*a*, for example. In the arrangement shown in the drawings, member 21 is fastened intermediate its ends at the approximate center of the armature 4.

The member 21 is provided with a pair of spaced-apart parallel ears 22, the ears having suitable openings matching corresponding openings in flanges 15′ so that a suitable pivot pin 23 may extend through the matching openings whereby armature 4 is pivotally mounted between the flanges 15′. The pin 23 may be retained in place in any suitable manner, not shown.

The member 21 has end portions 24 and 24*a* bent into positions approximately perpendicular to the main body of the bracket member 21 and extending through suitable openings in armature 4 as best seen in Fig. 5. The motion of armature 4 is limited by the lengths of portions 24 and 24*a* extending below the armature, as seen in Fig. 5, and the engagement between the respective ends and the adjacent ends of the core 2. The corner portions of bracket 21 are rounded as shown in order to minimize stress at the bends.

Under conditions when there is no ringing current applied to coil 3, it is desired to have armature 4 disposed in a neutral position. The neutral position is determined by the length of arm 24 and the armature 4 is urged into the neutral position by means of a suitable spring 25 which engages ear 26 projecting outwardly from bracket 21 at one end and the adjustable arm 27 of top plate 28 at the other. The amount of biasing effect provided by spring 25 is determined by the choice of the spring and the position of arm 27. Motion of the armature in the clockwise direction, as viewed in Fig. 5, is determined by the length of bracket portion 24*a*. The difference in lengths of portions 24 and 24*a* determines the amount of travel of the armature and hence the amount of travel of clapper 6′.

As pointed out earlier in this specification, an inherent dissymmetry in the flux change in the core legs 2*a* and 2*b* is produced from the placement of all of the coil turns on leg 2a and because the air gaps required for the operation of the device necessarily result in a coupling factor less than unity. While the use of a U-shaped laminated pole piece stack results in a compact magnetic structure that tends to improve the coupling factor, as previously noted, the inclusion in the electromagnetic circuit of the necessary operating air gaps between the armature and the pole faces limits the coupling factor to a value less than unity and to a degree that results in some undesirable effects from the unbalanced armature forces thereby produced. Such force effects include the tendency of the armature system to respond to ringing signals having a frequency of one-half that of the fundamental frequency to which the armature system is mechanically tuned and further includes a tendency for uneven striking of the ringer gongs as the level of the applied fundamental ringing frequency is changed.

It can be shown that the application of a sine wave ringing signal having a frequency of half that of the fundamental frequency to which the ringer armature is mechanically tuned will produce a current component at the fundamental frequency. This fundamental component operates on the electromagnetic system in such a manner that the flux change thereby produced at one pole face is in the same direction as that produced at the other pole face such that the net resultant force acting on the armature to produce motion becomes zero when the flux changes operative on the armature at each pole face are equal. These flux changes will be equal only when the coupling factor is unity for the case of a single pole leg winding or when equal windings are symmetrically disposed on each pole leg.

When a ringing signal of the fundamental frequency to which the ringer armature is mechanically tuned is applied, the unbalanced pole piece forces resulting from the placement of the entire coil winding on a single leg of the U-shaped structure change in ratio as the armature amplitude is varied by changes in the level of the applied signal level and tend to produce uneven striking of the ringer gongs.

In Figs. 8 and 9 there are illustrated modifications of the armature 4 shown in Figs. 1–7, inclusive, in which the face of the armature adjacent the ends of arms 2a and 2b is modified to more nearly equalize the forces acting on the armature adjacent the pole ends of arms 2a and 2b, respectively. For example, in Fig. 8 there is shown an armature portion 4a provided with an opening 29 opposite the coil carrying arm 2a. The purpose of the opening or hole 29 is to reduce the area of the armature face opposite or adjacent to the arm 2a, preferably to such an extent that the area of that portion of the armature face opposite arm 2a is sufficiently less than the area of that portion of the armature which is opposite the other arm 2b that the force acting on the armature adjacent the end of arm 2a is substantially the same as the force acting on armature 4a opposite the end of arm 2b. The provision of the opening 29 in armature 4a opposite the pole face of the coil bearing pole leg 2a reduces the effective area of the armature at the air gap between armature 4a and arm 2a and thereby reduces the armature pull at this air gap relative to that produced at the air gap between armature 4a and arm 2b and effectively reduces the above-described unbalanced effects.

It will be understood by those skilled in the art that the optimum area of opening 29 is determined by the frequency to which the ringer is required to respond. In order to accommodate different ringing frequencies, armatures may be provided with differently sized openings to obtain optimum results or a single compromise area may be determined for ringers of all tuned frequencies.

In Fig. 9 there is illustrated a modification in which the area of armature 4b is reduced opposite arm 2a by removing material from the opposite edges of armature 4b as indicated by the numerals 30, the effect being the same as provided by the arrangement of Fig. 8.

While I have shown and described a particular embodiment of my invention, it will be obvious to those skilled in the art that changes and modifications may be made without departing from my invention its broader aspects. I, therefore, aim in the appended claims to cover all such changes and modifications as fall within the true spirit and scope of my invention.

What I claim is:

1. In a telephone ringer, a magnetic base, a core supported from said base, a coil mounted on a portion of said core, and adapted to be energized by ringing current, a bar type permanent magnet having coincident polar and longitudinal axes, said magnet having its ends in fixed abutting relationship with respect to said core and to said base, respectively, a yoke carried by said base and having spaced-apart parallel portions arranged to constitute pole portions, an armature, and means for supporting said armature in edgewise relation with respect to said pole portions and in operative relation with respect to said core.

2. In a telephone ringer, a magnetic base, a core supported from said base, a coil mounted on a portion of said core and adapted to be energized by ringing current, a bar type permanent magnet having coincident polar and longitudinal axes, said magnet having ends in fixed abutting relationship with respect to said core and said base, respectively, a yoke carried by said base and having substantially parallel spaced-apart pole forming portions, and an elongated armature disposed in edgewise relationship with respect to said pole portions and in operative relation with respect to said core.

3. In a telephone ringer, a magnetic base, a core supported from said base, a coil mounted on a portion of said core and adapted to be energized by ringing current, a bar type permanent magnet having coincident polar and longitudinal axes, said magnet having ends in fixed abutting relationship with respect to said core and said base, respectively, a yoke having substantially parallel spaced-apart pole forming portions, said yoke being carried by said base, and a substantially rectangular armature, said armature being disposed edgewise between said pole forming portions to provide a pair of air gaps between said armature and said portions.

4. In a telephone ringer, a magnetic base, a core supported from said base, a coil mounted on a portion of said core and adapted to be energized by ringing current, a bar type permanent magnet having coincident polar and longitudinal axes, said magnet having ends in fixed abutting relationship with respect to said core and said base, respectively, a yoke having substantially parallel spaced-apart pole forming portions, said yoke being carried by said base, and a substantially rectangular armature, said armature being disposed edgewise between said pole forming portions to provide a pair of air gaps between said armature and said portions, said armature also being disposed adjacent the ends of said core in order to provide a pair of air gaps between said armature and said core.

5. In a telephone ringer, an L-shaped magnetic base, a U-shaped core supported from one portion of said base in spaced relation therewith, a permanent magnet disposed between the closed end of said core and said one portion, a yoke carried by the other portion of said base and having a pair of substantially parallel spaced-apart pole forming portions, an armature mounted edgewise between said pole forming portions and spaced from said core in order to provide a pair of air gaps between said yoke and said core and between each end of said core and said armature, an electromagnet carried by said core, and means for energizing said electromagnet to cause said armature to approach said electromagnet.

6. In a telephone ringer, a magnetic base, a core supported from said base, a coil mounted on a portion of said core and adapted to be energized by ringing current, a bar type permanent magnet having coincident polar and longitudinal axes, said magnet having its ends in fixed abutting relationship with respect to said core and said base, respectively, a yoke carried by said base, opposite ends of said yoke being arranged to constitute pole portions, an armature, means for pivotally supporting said armature in edgewise relation with respect to said pole portions and in operative relation with respect to said core, and means for biasing said armature to a predetermined position with respect to said core.

7. In a telephone ringer, a magnetic base, a core supported from said base, a coil mounted on a portion of said core and adapted to be energized by ringing current, a bar type permanent magnet having coincident polar and longitudinal axes, said magnet having its ends in fixed abutting relationship with respect to said core and said base, respectively, a yoke carried by said base, opposite ends of said yoke being arranged to constitute pole portions, and an armature disposed in edgewise relation with respect to said pole portions and in operative relation with respect to said core.

8. In a telephone ringer, a magnetic base, a core supported from said base, a coil mounted on a portion of said core and adapted to be energized by ringing current, a bar type permanent magnet having coincident polar and longitudinal axes, said magnet having its ends in fixed abutting relationship with respect to said core and said base, respectively, a yoke carried by said base, opposite ends of said yoke being arranged to constitute pole portions, an armature, and a spring-like reed for supporting said armature in edgewise relation with respect to said pole portions and in operative relation with respect to said core.

9. In a telephone ringer, a magnetic base, a core supported from said base, a coil mounted on a portion of said core and adapted to be energized by ringing current, a bar type permanent magnet having coincident polar and longitudinal axes, said magnet having ends in fixed abutting relationship with respect to said core and said base, respectively, a yoke carried by said base and having substantially parallel spaced-apart pole forming portions at each end thereof, and an elongated armature disposed in edgewise relationship with respect to said pole portions and in operative relation with respect to said core.

10. In a telephone ringer, a magnetic base, a core supported from said base, a coil mounted on a portion of said core and adapted to be energized by ringing current, a bar type permanent magnet having coincident polar and longitudinal axes, said magnet having ends in fixed abutting relationship with respect to said core and said base, respectively, a yoke having substantially parallel spaced-apart pole forming portions at each end thereof, said yoke being carried by said base, and a substantially rectangular armature disposed in edgewise relationship with respect to said pole portions and in operative relation with respect to said core, said armature being disposed edgewise between said pole forming portions to provide a pair of air gaps in parallel between said armature and said portions at each end of said core.

11. In a telephone ringer, a magnetic base, a core supported from said base, a coil mounted on a portion of said core and adapted to be energized by ringing current, a bar type permanent magnet having coincident polar and longitudinal axes, said magnet having ends in fixed abutting relationship with respect to said core and said base, respectively, a yoke having substantially parallel spaced-apart pole forming portions at each end thereof, said yoke being carried by said base, and a substantially rectangular armature disposed in edgewise relationship with respect to said pole portions and in operative relation with respect to said core, said armature being disposed edgewise between said pole forming portions to provide a pair of air gaps in parallel between said armature and said portions at each end of said core, said armature also being disposed adjacent the ends of said core in order to provide a pair of air gaps between said armature and said core.

12. In a telephone ringer, an L-shaped magnetic base, a U-shaped laminated core supported from one portion of said base in spaced relation therewith, a permanent magnet disposed between the closed end of said core and said one portion, a yoke carried by the other portion of said base and having at each end thereof and adjacent each end of said core a pair of substantially parallel spaced-apart pole forming portions, a reed-like spring member connected at either end to the other portion of said base, an armature connected to said spring member intermediate the ends of both armature and spring so that said armature is mounted edgewise between said pole forming portions and spaced from said core in order to provide a pair of air gaps between said yoke and each end of said core and between each end of said core and said armature, an electromagnet carried by said core, and means for energizing said electromagnet to cause movement of said armature.

13. In a telephone ringer, a magnetic base a core supported from said base, a coil mounted on a portion of said core and adapted to be energized by ringing current, a bar type permanent magnet having coincident polar and longitudinal axes, said magnet having its ends in fixed abutting relationship with respect to said core and said base, respectively, a yoke carried by said base and having spaced-apart parallel portions located intermediate the ends thereof and arranged to constitute pole portions, an armature, means for pivotally supporting said armature in edgewise relation with respect to said pole portions and in operative relation with respect to said core, and means for biasing said armature to a predetermined position with respect to said core.

14. In a telephone ringer, a magnetic base, a core supported from said base, a coil mounted on a portion of said core and adapted to be energized by ringing current, a bar type permanent magnet having coincident polar and longitudinal axes, said magnet having its ends in fixed abutting relationship with respect to said core and said base, respectively, a yoke carried by said base, said yoke being provided with pole portions, an armature, means for pivotally supporting said armature in edgewise relation with respect to said pole portions and in operative relation with respect to said core, means for biasing said armature to a predetermined position with respect to said core, and means for limiting the movement of said armature toward either end of said core.

15. In a telephone ringer, a magnetic base, a U-shaped core having a pair of spaced arms and a closed end, a permanent magnet having coincident polar and longitudinal axes, said magnet having its ends in fixed abutting relationship with said core and said base, respectively, a coil adapted to be energized by ringing current mounted on one of said arms of said core whereby magnetic flux is dissymmetrically distributed in said core, an armature carried by said base in operative relationship with respect to said arms of said core, the area of that portion of said armature face opposite one of said arms being different from the area of that portion of said armature which is opposite the other of said arms, whereby the dissymmetrical magnetic flux distribution in said arms is resolved so that the force acting on said armature adjacent said one arm is substantially the same as the force acting on said armature adjacent said other arm.

16. The telephone ringer of claim 1 in which said coil is mounted on one of said arms whereby magnetic flux is dissymmetrically distributed in said core, and in which the area of that portion of said armature face opposite one of said arms is less than the area of that portion of said armature which is opposite the other of said arms, whereby the magnetic flux in said core is resolved so that the force acting on said armature adjacent said one arm is substantially the same as the force acting on said armature adjacent said other arm.

17. The telephone ringer of claim 15 in which the area of that portion of said armature face opposite the coil-mounting one of said arms is less than the area of that portion of said armature which is opposite the other of said arms, whereby the magnetic flux in said core is resolved so that the force acting on the portions of said armature adjacent said arms is substantially equal.

References Cited in the file of this patent

UNITED STATES PATENTS 841,215 Andrews ---------------- Jan. 15, 1907

1,177,988 Buhl ---------------- Apr. 4, 1916
1,339,778 Miller ---------------- May 11, 1920
1,523,423 Hoge ---------------- Jan. 20, 1925
1,656,250 Thompson ---------------- Jan. 17, 1928
1,704,084 Hayes ---------------- Mar. 5, 1929
2,375,586 Romer ---------------- May 8, 1945
2,404,227 Hall ---------------- July 16, 1946
2,526,685 Price ---------------- Oct. 24, 1950

FOREIGN PATENTS 374,168 Great Britain ---------------- June 9, 1932